(12) United States Patent
Kleckler

(10) Patent No.: US 8,596,993 B2
(45) Date of Patent: Dec. 3, 2013

(54) DUAL-PUMP SUPPLY SYSTEM WITH BYPASS-CONTROLLED FLOW REGULATOR

(75) Inventor: Joel W. Kleckler, Rockton, IL (US)

(73) Assignee: Woodward, Inc., Fort Collins, CO (US)

( * ) Notice: Subject to any disclaimer, the term of this patent is extended or adjusted under 35 U.S.C. 154(b) by 800 days.

(21) Appl. No.: 12/683,685

(22) Filed: Jan. 7, 2010

(65) Prior Publication Data
US 2011/0162724 A1 Jul. 7, 2011

(51) Int. Cl.
*F04B 49/00* (2006.01)
*G05D 7/00* (2006.01)

(52) U.S. Cl.
USPC .. 417/288; 417/286; 137/115.23; 137/115.13

(58) Field of Classification Search
USPC ............... 417/53, 288, 287, 286; 137/115.13, 137/115.19, 115.23
See application file for complete search history.

(56) References Cited

U.S. PATENT DOCUMENTS

| | | | | |
|---|---|---|---|---|
| 2,780,172 A | * | 2/1957 | Coar | 417/62 |
| 2,835,323 A | * | 5/1958 | Booth | 137/565.33 |
| 3,801,228 A | * | 4/1974 | Mueller | 417/282 |
| 3,953,153 A | | 4/1976 | Huber et al. | |
| 4,102,606 A | | 7/1978 | Huber et al. | |
| 4,245,964 A | * | 1/1981 | Rannenberg | 417/287 |
| 4,591,317 A | * | 5/1986 | Markunas | 417/288 |
| 5,087,177 A | * | 2/1992 | Haley et al. | 417/426 |
| 5,865,602 A | * | 2/1999 | Nozari | 417/44.1 |
| 5,918,573 A | | 7/1999 | Killion | |
| 7,234,293 B2 | * | 6/2007 | Yates et al. | 60/39.281 |
| 7,497,083 B2 | * | 3/2009 | Yates et al. | 60/734 |
| 2002/0073974 A1 | * | 6/2002 | Gillis et al. | 123/499 |
| 2003/0192300 A1 | * | 10/2003 | Mahoney et al. | 60/39.281 |
| 2005/0262824 A1 | * | 12/2005 | Yates et al. | 60/39.281 |
| 2009/0053077 A1 | * | 2/2009 | Arnett et al. | 417/302 |
| 2009/0095259 A1 | * | 4/2009 | Pursifull et al. | 123/457 |

FOREIGN PATENT DOCUMENTS

EP 1 965 055 A2 9/2008

* cited by examiner

*Primary Examiner* — Charles Freay
*Assistant Examiner* — Alexander Comley
(74) *Attorney, Agent, or Firm* — Reinhart Boerner; Van Deuren P.C.

(57) ABSTRACT

A dual-supply fluid distribution system includes a first pump having an inlet and an outlet. The first pump is configured to supply a first fluid flow. A second pump has an inlet and an outlet, and is configured to supply a second fluid flow. A check valve is coupled between the first and second pump outlets. The check valve is configured to combine the second fluid flow with the first fluid. A bypass valve is coupled to the outlet of the first pump. The bypass valve has an integral pilot valve and is configured to permit fluid flow from the pump outlets in excess of the fluid demand to recirculate back to the first and second pump inlets. The bypass valve and integral pilot valve are configured to cause the check valve to open when the flow of fluid through the bypass valve is below a threshold amount.

26 Claims, 2 Drawing Sheets

DUAL-PUMP SUPPLY SYSTEM WITH BYPASS-CONTROLLED FLOW REGULATOR

FIELD OF THE INVENTION

This invention generally relates to fuel distribution systems, and, more particularly, to fuel distribution systems such as those typically employed in aircraft turbine engines.

BACKGROUND OF THE INVENTION

Aircraft turbine engine main fuel pumps are typically high-pressure positive-displacement pumps in which the pump flow rate is proportional to engine speed. At many engine operating conditions the engine flow demand is significantly less than the high amount of flow supplied by the main fuel pump. The excess high-pressure pump flow is typically bypassed back to the low pressure inlet. Raising the pressure of the excess flow and then bypassing it back to the low-pressure typically wastes energy. Generally, this wasted energy is converted to heat, which flows into the fuel and results in undesirably high fuel temperatures.

Systems that use two fuel supplies, for example two positive displacement pumps, can be used to minimize the amount of bypass flow at high pressure differentials. This can be done by separating the two supply flows and only bypassing flow from one pump at a high pressure differential (e.g., the second supply pump would be bypassed at a much lower pressure differential). This reduces the wasted energy (i.e., heat) added to the fuel.

One problem encountered in implementing fuel distribution systems with dual pump supplies is that when the second pump supply is added (or subtracted) to the first pump supply, the system often generates unacceptable flow transients resulting from the switch between single-supply and dual-supply operating modes.

It would therefore be desirable to have a system and method for dual-supply fuel distribution that reduces the flow transients which normally occur during transitions between single-supply and dual-supply operating modes. Embodiments of the invention provide such a system and method. These and other advantages of the invention, as well as additional inventive features, will be apparent from the description of the invention provided herein.

BRIEF SUMMARY OF THE INVENTION

In one aspect, embodiments of the invention provide a dual-supply fluid distribution system configured to operate in a single-supply mode or a dual-supply mode, depending on a fluid flow demand. In at least one embodiment, the dual-supply fluid distribution system includes a first pump having an inlet and an outlet. The first pump is configured to supply a first flow of fluid. A second pump has an inlet and an outlet, and is configured to supply a second flow of fluid. Further, a check valve is coupled between the outlets of the first and second pumps. The check valve, when at least partially open, is configured to combine the second flow of fluid with the first flow of fluid. Further still, a bypass flow valve is coupled to the outlet of the first pump. The bypass flow valve has an integral pilot valve, wherein the bypass flow valve is configured to, when at least partially open, permit fluid flow from the pump outlets in excess of the fluid flow demand to recirculate back to the first and second pump inlets. Additionally, the bypass flow valve and integral pilot valve are configured to cause the check valve to open when the flow of fluid through the bypass flow valve is below a threshold amount.

In another aspect, embodiments of the invention provide a method of supplying fluid at a metered rate that includes pumping fluid to a metering valve. In this embodiment, the method, pumping fluid to a metering valve includes supplying fluid to the metering valve from a first pump, and supplying fluid to the metering valve from a second pump when a fluid flow demand exceeds that which can be adequately supplied by the first pump. This embodiment of the method further includes sensing the fluid flow demand via an integrated bypass flow valve and pilot valve. Further, the pilot valve is configured to position a pressurizing valve, thus causing a flow output from the second pump to be added to a flow output from the first pump.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the following description, embodiments of the invention are disclosed with respect to their application in a fuel distribution system. However, one having ordinary skill in the art will recognize that embodiments of the invention described herein can be applied to the distribution of a variety of fluids, including but not limited to fuels, where the fluid output supplied by the system is metered. Accordingly, embodiments of the invention include dual-supply systems for the distribution of essentially any fluid that is typically supplied by such a fluid distribution system.

Figure 1:
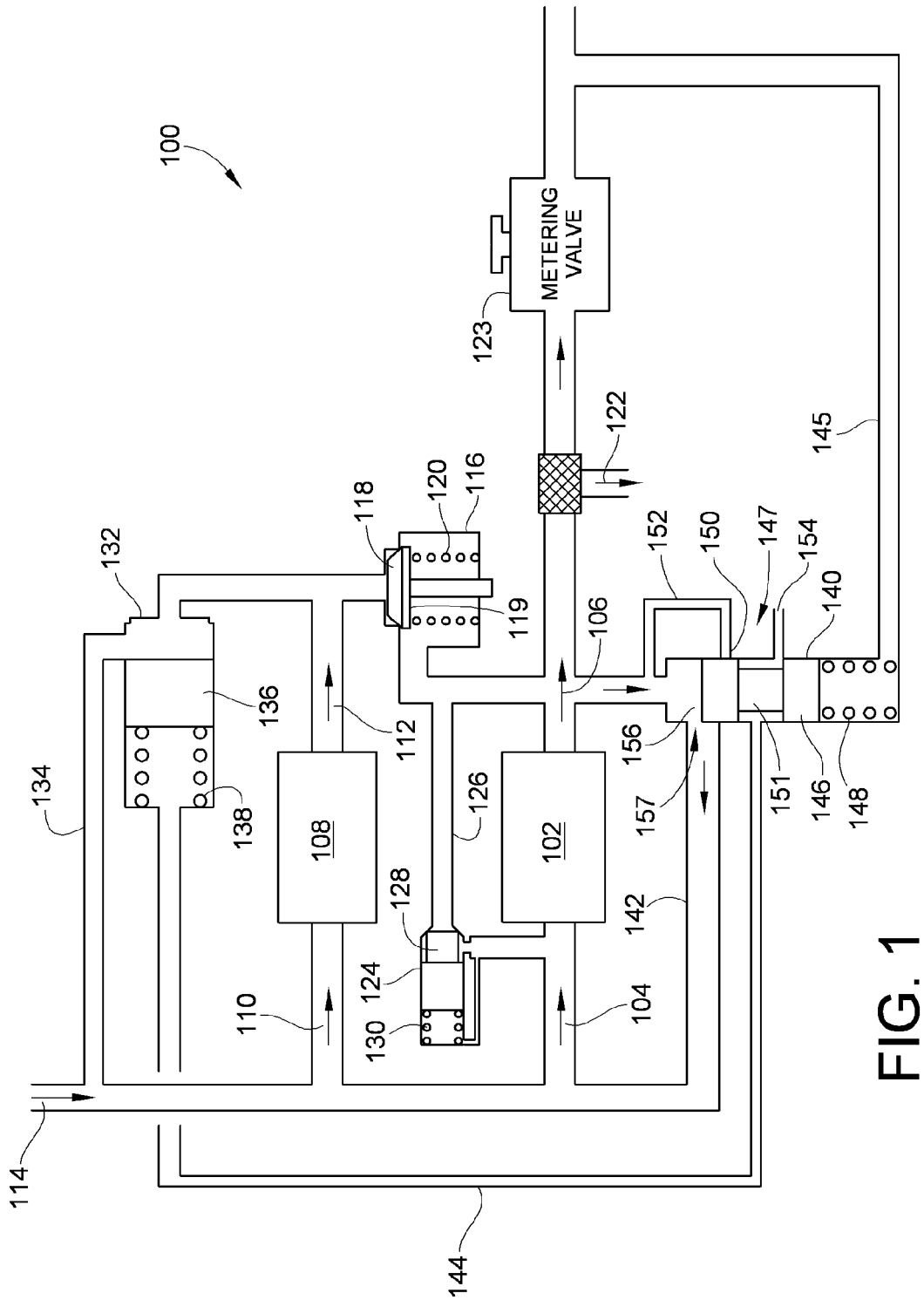
FIG. 1 is a schematic diagram of an embodiment of a fuel distribution system, constructed in accordance with the teachings of the present invention, and operating in single-supply mode.

FIG. 1 is a schematic representation of a dual-supply fuel distribution system 100 positioned so that only a first fuel pump supply 102 is providing a high-pressure fuel supply flow to an actuator supply port 122 and to a metering valve 123, according to an embodiment of the invention. In this single-supply mode of operation, a second fuel pump supply 108 has its discharge output flow returned back to an inlet 110 with minimal pressure rise across that second fuel pump supply 108. When operating in the single-supply mode, the amount of fuel flow from the first fuel pump supply 102 that is raised to high pressure is much closer to the flow demand than with a traditional single-supply system, where the flow supply often greatly exceeds the flow demand. Better alignment of the fuel supply with the fuel demand results in less high-pressure differential bypass flow and less heat energy added to the fuel.

As seen in FIG. 1, the fuel distribution system 100 includes the first fuel pump supply 102, which has an inlet 104 and a discharge outlet 106, and the second fuel pump supply 108, which has an inlet 110 and a discharge outlet 112. Both of the pump supply inlets 104, 110 are fed by a common supply line 114. A check valve 116 is coupled between the discharge outlet 106 of the first fuel pump supply 102 and the discharge outlet 112 of the second fuel pump supply 108. The check valve 116 includes a check valve member 118 and a biasing element 120. In an embodiment of the invention, the biasing element 120 includes a coil spring. The biasing element 120 is configured to bias the check valve member 118 towards the closed position.

The actuator supply port 122 is coupled directly to the discharge outlet 106 of the first fuel pump supply 102, and coupled through the check valve 116 to the discharge outlet 112 of the second fuel pump supply 108. The metering valve 123 is configured to supply fuel to the engine (not shown) according to a fuel flow demand. The actuator supply port 122 is configured to provide pressurized fuel to operate various auxiliary systems, for example hydraulic systems (not shown), as required. A high-pressure relief valve 124 is located on a first feedback line 126, which connects the discharge outlet 106 to the inlet 104 of the first fuel pump supply 102. The high-pressure relief valve 124 includes a relief valve member 128 and a biasing element 130, which, in at least one embodiment, includes a coil spring. The biasing element 130 is configured to bias the relief valve member 128 towards the closed position. The high-pressure relief valve 124 is configured to direct fuel flow from the first fuel supply pump 102, in single-supply mode, or from the combined first and second fuel supply pumps 102, 108, in dual-supply mode, back to the inlet 104. At some threshold pressure high enough to counteract the force exerted by the biasing element 130, the high-pressure relief valve member 128 opens to permit fuel flow to the inlet 104 via the first feedback line 126.

At one end, a pressurizing valve 132 is coupled to a second feedback line 134 that connects the discharge outlet 112 of the second fuel pump supply 108 to the common supply line 114. At the other end, the pressurizing valve 132 is coupled to a pilot valve 147 that includes a valve member 146 and a port 150 leading to flow line 152. The pressurizing valve 132 includes a pressurizing valve member 136 and a biasing element 138, which, in at least one embodiment, includes a coil spring. The biasing element 138 is configured to bias the pressurizing valve member 136 towards the closed position.

A bypass flow valve 140 is located on a bypass flow line 142 connecting the common supply line 114 and the discharge outlet 106 of the first fuel pump supply 102. The bypass flow valve 140 is also coupled to the discharge outlet 112 of the second fuel pump supply 108 through the check valve 116. The bypass flow valve 140 is also coupled to the output of the metering valve 123 via line 145. The bypass flow valve 140 includes a bypass valve member 146 and a biasing element 148, which, in at least one embodiment, is a coil spring. The biasing element 148 is configured to bias the bypass valve member 146 towards the closed position. The integral pilot valve 147 is integrated into the bypass flow valve 140. The bypass valve member 146 also operates as the valve member for both the bypass flow valve 140 and the integral pilot valve 147.

The integral pilot valve 147 is configured to communicate a signal pressure via line 144 to the pressurizing valve 132, thus causing the pressure at the discharge outlet 112 of the second fuel pump supply 108 to increase or decrease depending on the amount of signal pressure. In single-pump supply mode operation, the integral pilot valve port 150 is generally closed and a bypass port flow path 157 through the bypass flow valve 140 is open allowing a flow through the valve. In this case, a large-diameter portion 156 of the bypass valve member 146 blocks any flow to a pilot valve line 152 via pilot valve port 150. A small-diameter portion 151 of the bypass valve member 146 is aligned with a flow line 154 so that there is fluid communication between line 154 and line 144 leading the pressurizing valve 132. Flow line 154 is coupled to the common supply line 114. As will be seen below, when the fuel flow demand is such that the bypass valve member 146 moves towards the closed position, the integral pilot valve 147 opens when the small-diameter portion 151 of the bypass valve member 146 aligns with port 150, thus permitting fuel to flow through the pilot valve 147 to the pressurizing valve 132 via line 144.

In operation, fuel from the common supply line 114 feeds into inlets 104, 110 for the first and second fuel pump supplies 102, 108. As stated above, the fuel distribution system 100, shown in FIG. 1, is operating in single-supply mode, which is evidenced by the fact that check valve 116 is closed. This causes the fuel being discharged from the second fuel pump supply 108 to flow back through the pressurizing valve 132 to the common supply line 114 where it flows to the inlets 104, 110 of the first and second fuel pump supplies 102, 108. The biasing element 138 and the signal pressure from line 144 act to urge the pressurizing valve member 136 towards the closed position, however, as long as the bypass port flow path 157 remains substantially open, the pressure from the outlet 112 of the second fuel pump supply 108 keeps the pressurizing valve member 136 at least partially in the open position. With the pressurizing valve 132 at least partially in the open position, fuel from the second fuel pump supply 108 flows from the discharge outlet 112 back to the common supply line 114. The pressurizing valve 132 will remain at least partially in the open position as long as the fuel pressure from the discharge outlet 112 is high enough to counteract the force placed on the pressurizing valve member 136 by the biasing element 138 and the signal pressure from line 144.

Generally, the check valve 116 is configured to be closed while the discharge pressure 112 from the second fuel pump supply 108 is below the discharge pressure 106 of the first fuel pump supply 102. Pressure from the discharge outlet 106 of the first fuel pump supply 102 is exerted on a back face of the 119 of the check valve member 118. Along with the pressure from the discharge outlet 106 exerted on back face 119, the check valve biasing element 120 is configured to exert sufficient force on the check valve member 118 to keep the check valve 116 closed as long as the first supply pump 102 can adequately meet the fuel flow demand. With the check valve 116 closed, the only path for fuel flow from the discharge outlet 112 of the second fuel pump supply 108 is through the open pressurizing valve 132. While, typically, the second fuel pump supply 108 is run at a constant flow rate, the second feedback line 134 allows the flow from the low-pressure discharge outlet 112 of the second fuel pump supply 108 to be added to the common supply line 114 with minimal added pressure and minimal heat added to the inlet 110 fuel pressure. However, in alternate embodiments of the invention, it is contemplated that, when the fuel flow demand is low enough that the demand may be met solely by the first fuel supply pump 102, the second fuel pump supply 108 could be turned off to save energy and increase the efficiency of the fuel distribution system.

In single-pump supply mode, output from the first fuel pump supply 102, in excess of the fuel flow demand, flows through the bypass port flow path 157 and back to the inlet 104 via the bypass flow line 142. However, when the flow demand increases sufficiently, the amount of bypass flow from the first fuel pump supply 102 drops below a threshold amount. The resulting drop in pressure causes the valve member 146 to close due to the action of the biasing element 148. When operation of the bypass flow valve 140 causes the bypass port flow path 157 to move towards the closed position, the small-diameter portion 151 of the bypass valve member 146 is positioned so as to open the integral pilot valve 147 permitting flow through pilot valve port 150. This routes the supply flow from the discharge outlet 106 of the first fuel pump supply 102 to flow through the small-diameter pilot valve line 152 via the integral pilot valve port 150, and then to the pressurizing valve 132 via line 144. As the bypass flow is reduced due to the aforementioned increased flow demand, pilot valve port 150 is opened allowing flow from line 152 to line 144. This action raises the pressure in line 144. The pressure from line 144 urges the pressurizing valve member 136 towards the closed position, restricting the flow from the discharge outlet 112 of the second fuel pump supply 108 to second feedback line 134. This causes an increase in pressure at the discharge outlet 112 of the second fuel pump supply 108.

The closing of the pressurizing valve 132 causes the pressure from the discharge outlet 112 on the face of the check valve member 118 to increase. When the second fuel pump supply discharge outlet 112 pressure is greater than the first fuel pump supply discharge outlet 106 pressure plus a small pressure drop due to the check valve biasing element 120, the check valve 116 will open allowing flow from the second fuel pump supply 108 to be added to the first fuel pump supply 102 flow. In this manner, the bypass flow valve 140, integral pilot valve 147, and second fuel pump supply 108, and pressurizing valve 132 all combine to regulate the bypass flow from the first fuel pump supply 102. As will be explained below, these system components also combine to regulate the bypass flow from both the first and second fuel pump supplies 102, 108.

One advantage of embodiments of fuel distribution system 100 is the reduction of flow transients associated with switching back and forth between single-supply and dual-supply operating modes. More specifically, one of the advantages of embodiments of this dual-supply system over conventional dual-supply systems is that the flow transient produced by embodiments of the fuel distribution system disclosed herein may be smooth enough that fuel flow from the second fuel pump supply 108 can be added or subtracted to meet, for example, the actuation transient flow demand without adversely affecting the metered fuel flow. In some applications, this allows the first fuel pump supply 102 to be downsized, thus allowing for greater thermal benefit.

Figure 2:
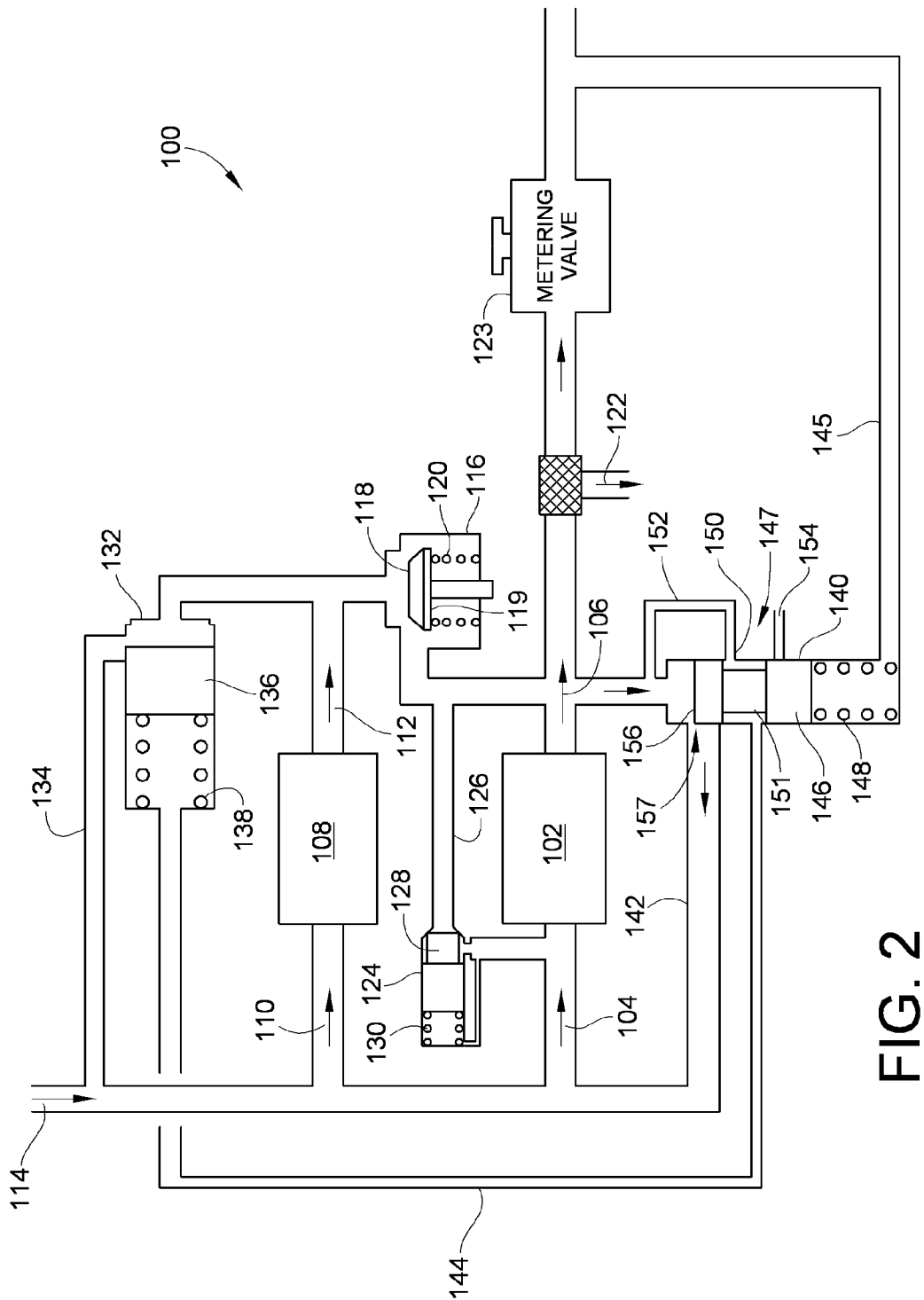
FIG. 2 is a schematic diagram of an embodiment of a fuel distribution system, constructed in accordance with the teachings of the present invention, and operating in dual-supply mode.

FIG. 2 is a schematic illustration of the fuel distribution system 100 operating in the dual-supply mode, as evidenced by the open check valve 116. As long as the discharge pressure from the second fuel pump supply 108 is greater than the discharge pressure from the first fuel pump supply 102, the check valve member 118 will remain in the open position. However, as configured, the closing of the check pressurizing valve 132 causes an increase in pressure that opens the check valve 116 and gradually adds flow from the second fuel pump supply 108 to the flow from the first fuel pump supply 102. As the control flow in line 144 continues to close the pressurizing valve 132, more pressure and flow is directed away from the pressurizing valve 132 towards the check valve 116. If the pressurizing valve 132 is completely closed, the entire pump flow from the second fuel pump supply 108 is directed through the check valve 116 and added to the flow from the first fuel pump supply 102. The gradual addition of fuel flow from the second fuel pump supply 108 due to the gradual closing of the pressurizing valve 132 assures minimal or no flow transients due to increase fuel flow demand. Sharp increases, or decreases, in flow demand can be accommodated without the resulting metering problems that might occur in conventional fuel distribution systems through operation of the bypass flow valve 140 and the ability to increase or decrease fuel flow through control of the pressurizing valve 132.

In the same manner that sudden increases to the fuel flow demand can be satisfied with minimal or no flow transients, sudden decreases to the fuel flow demand can be satisfied by the gradual opening of the pressurizing valve 132. When the fuel distribution system 100 is operating in the dual-pump supply mode, a subsequent decrease in the fuel flow demand will cause an increase in the pressure of the bypass fuel flow. This pressure increase will urge the bypass valve member 146 towards the open position, thus creating a flow in the bypass port flow path 157. As the bypass flow path 157 opens, the movement of the bypass valve member 146 causes the integral pilot valve 147 to close pilot valve port 150 and open line 154, causing a fuel pressure decrease in line 144. The small-diameter portion 151 of the bypass valve member 146 aligns with flow line 154 and flow line 144. As a result, the fuel in line 144, and surrounding the small-diameter portion 151 of the bypass valve member 146, is dumped back into the common supply line 114 via line 154, thus decreasing the signal pressure in line 144 and urging the pressurizing valve member 136 towards the open position.

This decreased signal pressure in line 144 allows the pressurizing valve 132 to open, thus routing some of the flow from the discharge outlet 112 of the second fuel pump supply 108 to the second feedback line 134. The gradual opening of the pressurizing valve 132 reduces the pressure on the face of the check valve member 118, allowing the check valve 116 to gradually close as the discharge pressure for the second fuel pump supply 108 decreases. If the fuel flow demand decreases sufficiently, the bypass flow valve 140 will remain open and the pressurizing valve 132 will open completely. As a result of the gradual opening of the pressurizing valve 132, there will be a decreasing pressure from the discharge outlet 112 on the face of the check valve member 118. Thus, the check valve 116 will gradually close until all of the flow from the second fuel supply pump 108 is flowing into second feedback line 134. This gradual decrease in fuel flow from the second fuel pump supply 108 to the metering unit 123 reduces or eliminates the likelihood of metering problems due to flow transients.

As stated above, embodiments of the fuel distribution system described herein may be used in the distribution of fluids other than those used as fuel. One of ordinary skill in the art will recognize that embodiments of the invention may encompass uses in a variety of fluid distribution systems. However, that said, one of ordinary skill in the art will also recognize that embodiments of the invention are well-suited to aircraft fuel distribution systems where the efficiencies provided by the aforementioned embodiments may result in systems that are lighter and less costly than conventional aircraft fuel distribution systems. Further, aircraft fuel distribution systems incorporating an embodiment of the invention may be more thermally efficient than conventional fuel distribution systems, in which case, the need for cooling systems is greatly reduced, resulting in additional weight and cost savings.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dual-supply fluid distribution system configured to operate in a single-supply mode or a dual-supply mode, depending on a fluid flow demand, the dual-supply fluid distribution system comprising:
   a first pump having an inlet and an outlet, the first pump configured to supply a first flow of fluid;
   a second pump having an inlet and an outlet, the second pump configured to supply a second flow of fluid;
   a bypass flow valve coupled to the outlet of the first pump, the bypass flow valve having an integral pilot valve, the bypass flow valve configured to, when at least partially open, permit fluid flow from the pump outlets in excess of the fluid flow demand to recirculate back to the first and second pump inlets; and
   a pressurizing valve coupled between the outlet of the second pump and the first and second pump inlets, the pressurizing valve being configured to, when at least partially open, permit fluid flow from the second pump outlet to recirculate back to the first and second pump inlets, wherein the pressurizing valve is fluidly coupled to the integral pilot valve by a fluid line, the pressurizing valve being configured to open or close based on a signal pressure transmitted via fluid supplied to the pressurizing valve from the integral pilot valve solely through the fluid line;
   wherein the integral pilot valve is configured to cause the pressurizing valve to close via fluid supplied to the pressurizing valve from the integral pilot valve through the fluid line when the flow of fluid through the bypass flow valve is below a threshold amount; and
   wherein the closing of the pressurizing valve is configured to cause the second flow of fluid to combine with the first flow of fluid.

2. The dual-supply fluid distribution system of claim 1, further comprising a metering valve, wherein, in single-supply mode, the flow of fluid from the first pump is supplied to the metering valve, and, in dual-supply mode, the flow of fluid from the first and second pumps is supplied to the metering valve.

3. The dual-supply fluid distribution system of claim 1, further comprising an actuator supply unit, wherein, in single-supply mode, the flow of fluid from the first pump is supplied to the actuator supply unit, and, in dual-supply mode, the flow of fluid from the first and second pumps is supplied to the actuator supply unit, and wherein the actuator supply unit is configured to supply pressurized fluid to a hydraulic system.

4. The dual-supply fluid distribution system of claim 1, wherein the integral pilot valve is configured to, when open, bias the pressurizing valve towards a closed position.

5. The dual-supply fluid distribution system of claim 1, further comprising a check valve that, when at least partially open, is configured to allow the fluid flow from the second pump to combine with the fluid flow from the first pump.

6. The dual-supply fluid distribution system of claim 5, wherein the check valve has a check valve member that is biased towards a closed position by a biasing element, and wherein the biasing element includes a coil spring.

7. The dual-supply fluid distribution system of claim 5, wherein the pressurizing valve, when partially or fully closed, is configured to cause the check valve to open.

8. The dual-supply fluid distribution system of claim 1, wherein the pressurizing valve has a pressurizing valve member that is biased towards a closed position by a biasing element, and wherein the biasing element includes a coil spring.

9. The dual-supply fluid distribution system of claim 1, wherein the bypass flow valve includes a bypass valve member, the bypass valve member having both a large-diameter portion and a small-diameter portion.

10. The dual-supply fluid distribution system of claim 9, wherein the bypass valve member is biased towards a closed position by a biasing element, and wherein the biasing element includes a coil spring.

11. The dual-supply fluid distribution system of claim 9, wherein the bypass valve member also operates as the valve member for the integral pilot valve, and wherein the integral pilot valve is configured to open as the bypass valve member moves towards the closed position.

12. The dual-supply fluid distribution system of claim 11, wherein the integral pilot valve is open when a pilot valve flow line is aligned with the small-diameter portion of the bypass valve member, and wherein the integral pilot valve is closed when the pilot valve flow line is aligned with the large-diameter portion of the bypass valve member.

13. The dual-supply fluid distribution system of claim 1, wherein the pressurizing valve is configured to open and close gradually to reduce or eliminate the likelihood of flow transients during transitions between single-supply mode and dual-supply mode.

14. The dual-supply fluid distribution system of claim 1, further comprising a high-pressure relief valve configured to relieve pressure at the outlet of the first pump when that pressure exceeds a threshold level.

15. The dual-supply fluid distribution system of claim 14, wherein the high-pressure relief valve is further configured to relieve pressure from a combined output of the first and second pumps when that pressure exceeds the threshold level.

16. The dual-supply fluid distribution system of claim 1, wherein the dual-supply fluid distribution system comprises a dual-supply fuel distribution system for use in an aircraft.

17. A method of supplying fluid at a metered rate comprising:
pumping fluid to a metering valve, wherein pumping fluid to a metering valve comprises:
supplying fluid to the metering valve from a first pump;
supplying fluid to the metering valve from a second pump when a fluid flow demand exceeds that which can be adequately supplied by the first pump alone;
sensing the fluid flow demand via an integrated bypass flow valve and pilot valve;
biasing a pressurizing valve between open and closed positions, wherein biasing the pressurizing valve towards the closed position causes a flow output from the second pump to be added to a flow output from the first pump, wherein biasing the pressurizing valve between open and closed positions is controlled based on a signal pressure transmitted via fluid supplied to the pressurizing valve from the pilot valve solely through a fluid line between the pilot valve and the pressurizing valve.

18. The method of claim 17, further comprising operating a check valve configured to allow the flow output from the second pump to combine with the flow output from the first pump when the check valve is at least partially open.

19. The method of claim 17, wherein biasing a pressurizing valve comprises biasing the pressurizing valve towards the closed position via a fluid flow from the pilot valve, when the fluid flow demand is sufficiently high.

20. The method of claim 19, wherein biasing the pressurizing valve towards the closed position causes a check valve to gradually open.

21. The method of claim 17, further comprising relieving pressure at an outlet of the first pump when the pressure exceeds a threshold level, wherein relieving pressure comprises coupling a high-pressure relief valve between an inlet and the outlet of the first pump.

22. The method of claim 17, further comprising supplying fluid from a common supply line to an inlet of the first pump and to an inlet of the second pump.

23. The method of claim 17, further comprising pumping fluid to an actuator supply unit, wherein the actuator supply unit is configured to supply fluid to a hydraulic system.

24. The method of claim 23, wherein pumping fluid to an actuator supply unit comprises supplying fluid to the actuator supply unit from the first pump, and further supplying fluid to the actuator supply unit from the second pump when the fluid flow demand exceeds that which can be adequately supplied by the first pump alone.

25. The method of claim 17, wherein sensing the fluid flow demand via an integrated bypass flow valve and pilot valve comprises sensing the level of bypass fluid flow through the bypass flow valve and configuring the pilot valve to open when the bypass fluid flow through the bypass flow valve falls below a threshold level.

26. The method of claim 17, wherein the step of pumping fluid to a metering valve comprises pumping fuel to the metering valve in an aircraft fuel distribution system.

* * * * *